US006697024B2

(12) United States Patent
Fuerst et al.

(10) Patent No.: US 6,697,024 B2
(45) Date of Patent: Feb. 24, 2004

(54) EXTERIOR MIRROR WITH ANTENNA (75) Inventors: Peter Fuerst, Buergstadt (DE);
Kenneth Schofield, Holland, MI (US);
Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 33 days.

(21) Appl. No.: 10/001,583

(22) Filed: Oct. 19, 2001

(65) Prior Publication Data

US 2002/0126054 A1 Sep. 12, 2002

Related U.S. Application Data (60) Provisional application No. 60/242,315, filed on Oct. 20, 2000.

(51) Int. Cl.[7] .................................................. H01Q 1/32
(52) U.S. Cl. ........................ 343/711; 343/713; 343/873
(58) Field of Search ................................ 343/711, 713, 343/873

(56) References Cited

U.S. PATENT DOCUMENTS

| 4,205,325 A | 5/1980 | Haygood et al. ............ 340/147 |
| 4,258,352 A | 3/1981 | Lipschutz ..................... 340/53 |
| 4,342,210 A | 8/1982 | Denningham ................ 70/278 |
| 4,446,380 A | 5/1984 | Moriya et al. ................. 307/10 |
| 4,672,375 A | 6/1987 | Mochida et al. ........ 340/825.31 |
| 4,688,036 A | 8/1987 | Hirano et al. .......... 340/825.69 |
| 4,760,394 A | 7/1988 | Takeuchi et al. ....... 340/825.54 |
| 4,866,417 A | 9/1989 | DeFino et al. ................ 340/429 |
| 4,881,148 A | 11/1989 | Lambropoulos et al. .... 361/172 |
| 5,049,867 A | 9/1991 | Stouffer ....................... 340/426 |
| 5,113,182 A | 5/1992 | Suman et al. .......... 340/825.31 |
| 5,151,824 A | 9/1992 | O'Farrell ..................... 359/604 |
| 5,179,471 A | 1/1993 | Caskey et al. ............... 359/603 |
| 5,216,536 A | 6/1993 | Agrawal et al. ............. 359/274 |
| 5,446,576 A | 8/1995 | Lynam et al. ................ 359/267 |
| 5,497,305 A | 3/1996 | Pastrick et al. ............. 362/83.1 |

(List continued on next page.)

FOREIGN PATENT DOCUMENTS

| DE | 7323996 | 11/1973 | |
| JP | 660158702 A | 8/1985 | ............ H01Q/1/32 |

OTHER PUBLICATIONS

Commonly assigned, co–pending U.S. patent application, Ser. No. 09/876,816, filed Jun. 7, 2001 by Kenneth (NMI) Schofield and Niall R. Lynam, entitled Tire Inflation Assistance Monitoring System.

(List continued on next page.)

Primary Examiner—Hoang V. Nguyen
(74) Attorney, Agent, or Firm—Van Dyke, Gardner, Linn & Burkhart, LLP (57) ABSTRACT

An exterior rearview mirror assembly for a vehicle includes a reflective element subassembly which includes a reflective element mounted to a backing plate and/or bezel which extends at least partially around the back surface of the reflective element. An antenna is wound or otherwise positioned around at least a portion of a perimeter or outer portion of the reflective element subassembly. The antenna may be functional to transmit or receive signals for a corresponding signal device of the vehicle, such as a radio, a passive entry system, a cellular telephone system, and/or the like. The antenna and/or a connector for connecting the antenna to a corresponding connector at the mirror assembly or vehicle or door of vehicle may be integrally molded with the backing plate or bezel to further protect the antenna and improve the assembly processes of the mirror assembly.

62 Claims, 5 Drawing Sheets

U.S. PATENT DOCUMENTS

| | | | |
|---|---|---|---|
| 5,497,306 A | 3/1996 | Pastrick | 362/83.1 |
| 5,504,478 A | 4/1996 | Knapp | 340/825.69 |
| 5,572,354 A | 11/1996 | Desmond et al. | 359/265 |
| 5,669,704 A | 9/1997 | Pastrick | 362/83.1 |
| 5,823,654 A | 10/1998 | Pastrick et al. | 362/83.1 |
| 5,971,552 A | 10/1999 | O'Farrell et al. | 359/871 |
| 6,019,475 A | 2/2000 | Lynam et al. | 359/879 |
| 6,078,294 A * | 6/2000 | Mitarai | 343/713 |
| 6,175,164 B1 | 1/2001 | O'Farrell et al. | 307/10.1 |
| 6,176,602 B1 | 1/2001 | Pastrick et al. | 362/494 |
| 6,217,181 B1 | 4/2001 | Lynam et al. | 359/879 |
| 6,227,689 B1 | 5/2001 | Miller | 362/494 |
| 6,243,218 B1 | 6/2001 | Whitehead | 359/877 |
| 6,244,716 B1 * | 6/2001 | Steenwyk et al. | 359/603 |
| 6,259,412 B1 * | 7/2001 | Duroux | 343/713 |
| 6,276,821 B1 | 8/2001 | Pastrick et al. | 362/494 |
| 6,280,069 B1 | 8/2001 | Pastrick et al. | 362/494 |
| 6,294,989 B1 | 9/2001 | Schofield et al. | 340/442 |

OTHER PUBLICATIONS

Commonly assigned, co–pending U.S. patent application, Ser. No. 09/585,379, filed Jun. 1, 2000 by Barry Hutzel et al., entitled Rearview Mirror Assembly with Added Utility Functions.

* cited by examiner

EXTERIOR MIRROR WITH ANTENNA

CROSS-REFERENCE TO RELATED APPLICATION

This application claims priority of U.S. Provisional Application, Ser. No. 60/242,315, filed Oct. 20, 2000, which is hereby incorporated in its entirety herein by reference.

FIELD OF THE INVENTION

This invention relates generally to an exterior rearview mirror assembly for a vehicle and, more particularly, to an exterior rearview mirror assembly with an antenna for a signal transmitting or receiving device.

BACKGROUND OF THE INVENTION

It is known to implement an antenna at or in an exterior portion of a vehicle, such as at a door handle, pillar or rearview mirror assembly of a vehicle. An application of an antenna within the exterior rearview mirror assembly is disclosed in commonly assigned, U.S. Pat. No. 5,823,654, which is hereby incorporated herein by reference. The antenna is positioned at the exterior mirror bracket, sail, or housing or could be part of a light module or device at the exterior mirror. Such an antenna may be useful for transmitting or receiving signals for use in connection with a signal processing device or a signal transmitting device within the mirror or vehicle. Also, placement of an antenna in an exterior mirror assembly has been suggested in commonly assigned U.S. Pat. Nos. 5,971,552 and 6,019,475, and in U.S. patent application, Ser. No. 09/477,539, filed Jan. 4, 2000 by Lynam et al. for MODULAR REARVIEW MIRROR ASSEMBLY INCLUDING AN ELECTRONIC CONTROL MODULE, now U.S. Pat. No. 6,217,181, the disclosures of which are hereby incorporated herein by reference.

SUMMARY OF THE INVENTION

The present invention is intended to provide an exterior rearview mirror assembly for a vehicle having a transmitting or receiving device, such as an entry system, a passive entry system, a radio, a cellular phone system, a garage door opening system, a global positioning system and/or the like. The exterior rearview mirror assembly includes an antenna positioned at least partially around a back surface and/or perimeter of a backing plate and/or at a bezel for mounting a reflective element of the mirror assembly within the housing of the mirror assembly. The antenna may be suitable for transmission of signals from the vehicle or reception of signals from remote locations.

According to an aspect of the present invention, an exterior rearview mirror assembly for a vehicle comprises a housing and a reflective element subassembly, which is adjustably positioned within the housing. The reflective element subassembly includes a reflective element and a bezel and/or a backing plate. The reflective element subassembly further includes an antenna member which is positioned at the reflective element subassembly. The antenna may be positioned at least partially around a portion of the subassembly, such as at or within the bezel or backing plate or at some position therebetween.

According to another aspect of the present invention, an exterior rearview mirror assembly for a vehicle comprises a housing, a reflective element, a backing plate and an antenna member. The reflective element is mounted to the backing plate. The backing plate extends at least partially around a portion of the reflective element. The antenna member is positioned at the subassembly, such as at least partially around at least a portion of the backing plate or a bezel. Preferably, the backing plate is adjustably mounted to a mirror actuator, which is operable to adjust a position of the backing plate and reflective element with respect to the housing of the rearview mirror assembly.

The antenna member may transmit or receive signals from a signal device at the vehicle or a source remote from the vehicle, respectively. Optionally, the antenna member is integrally molded with the backing plate or bezel. A connector for connecting the antenna member to a corresponding connector at the mirror assembly, vehicle or door may also be integrally molded with the backing plate.

According to another aspect of the present invention, an exterior rearview mirror assembly for a vehicle includes a housing, a reflective element subassembly adjustably positioned within the housing, and an entry system. The reflective element subassembly includes a reflective element and at least one of a bezel and a backing plate. The reflective element subassembly further includes an antenna member. The entry system is operable to at least one of unlock a door of the vehicle and open a door of the vehicle in response to an unlocking signal. The antenna member is operable to receive the unlocking signal and to transmit the unlocking signal to the entry system.

In one form, the reflective element comprises an electro-optic element and, preferably, an electrochromic element. The reflective element subassembly may include a bezel positioned at a perimeter of the electrochromic element. The antenna member may be positioned at the bezel. Optionally, the entry system may comprise a passive entry system. Optionally, the exterior rearview mirror may include a security light and/or a turn signal indicator or the like.

Therefore, the present invention provides an antenna for an exterior rearview mirror assembly which is positioned at a backing plate or bezel of a reflective element subassembly for the mirror assembly. The antenna may be a transmitting or receiving antenna and may be integrally molded with the backing plate of the reflector. The present invention thus provides an antenna which is remote from the sheet metal of the vehicle for improved performance and which is positioned at a location which is less crowded and less visible than some of the applications of the prior art. Additionally, the antenna of the present invention facilitates enhanced assembly processes for the exterior rearview mirror assembly manufacturer, since the antenna may be implemented as a standard part of the reflective element subassembly and may then be installed with the backing plate and/or bezel and the reflective element in a standardized manner, and connected to an appropriate connector at the vehicle depending on the application.

These and other objects, advantages, purposes and features of this invention will become apparent upon review of the following specification in conjunction with the drawings.

DESCRIPTION OF THE PREFERRED EMBODIMENTS

Figure 1:
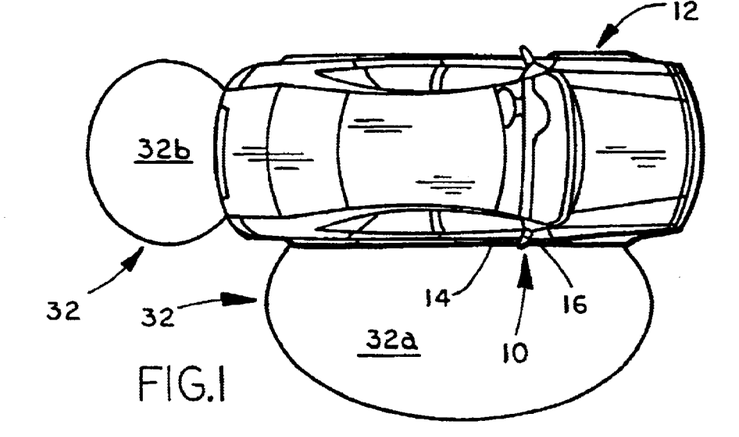
FIG. 1 is a top plan view of a vehicle in accordance with the present invention, showing the targeted zones for the signals associated with an antenna of the present invention.
Figure 2:
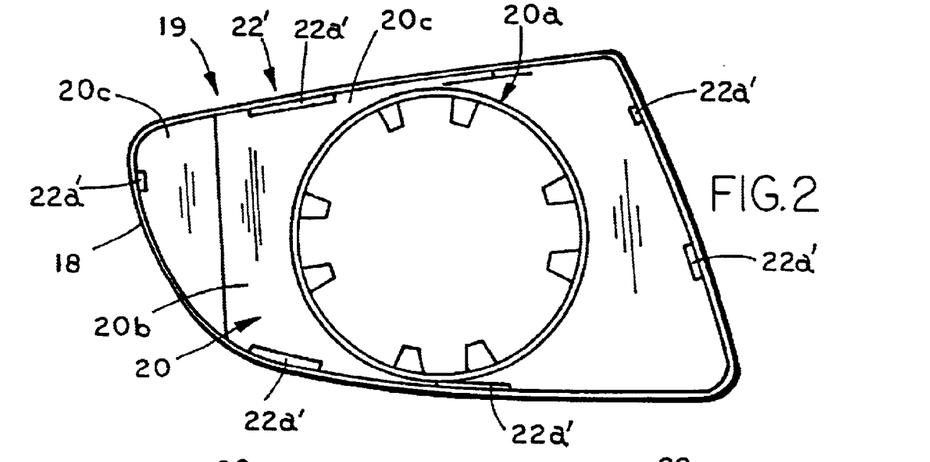
FIG. 2 is a view of a back of a reflective element subassembly, as viewed in a direction generally forwardly with respect to the vehicle, with a segmented antenna positioned at the backing plate in accordance with the present invention.

Referring now specifically to the drawings, and the illustrative embodiments depicted therein, an exterior rearview mirror assembly 10 is mounted at a side of a vehicle 12, such as at a forward portion of a front door 14 of the vehicle (FIG. 1). Exterior rearview mirror assembly 10 includes a housing 16, a reflective element 18 and a backing or mounting plate 20, which is secured to a back surface 18a of reflective element 18 (as best shown in FIGS. 6–8, 10 and 11). An antenna member or wire 22 is wrapped or positioned at least partially around an actuator mounting portion 20a or an outer circumference or perimeter region or edge 20c of backing plate 20 and/or at a bezel 36 of exterior rearview mirror assembly 10. Antenna 22 is operable to transmit signals to a remote location or receive signals from a remote source and is connectable to a signal processing device (not shown) within the vehicle which provides the signal to the antenna for transmitting or receives and processes the signal from the antenna. The signal device may comprise an entry system, a passive entry system, a radio, a tire pressure sensing system, such as disclosed in U.S. Pat. No. 6,294,989 and U.S. patent application, Ser. No. 09/876,816, filed Jun. 7, 2001 by Schofield et al. for TIRE INFLATION ASSISTANCE MONITORING SYSTEM, now U.S. Pat. No. 6,472,979, which are hereby incorporated herein by reference, a garage door opening system, a cellular phone system, a global positioning system and/or any other device for transmitting and/or receiving signals to/from a location remote from the vehicle. Backing plate 20 is preferably adjustably mounted to a mirror actuator 26 (FIG. 6) mounted within housing 16, and is adjustably positioned (preferably, electrically adjustably positioned) within or at housing 16 in response to actuator 26, as is known in the automobile mirror art. However, the exterior rearview mirror assembly 10 may be a manually adjustable mirror, whereby the backing plate is adjustably mounted to the housing or another generally fixed portion of the mirror assembly, without affecting the scope of the present invention.

Backing plate 20 and reflective element 18 define a reflective element subassembly 19 and are adjustably positioned relative to housing 16 to adjust a rearward field of view to the driver of the vehicle. Reflective element 18 may be any reflective element, such as a glass element coated on one of its surfaces with a suitable reflective layer or layers, such as a chrome layer or the like, such as those disclosed in U.S. Pat. No. 5,179,471, the disclosure of which is hereby incorporated herein by reference, or an electro-optic cell including a liquid crystal, electrochromic, or electrochemichromic fluid, gel or solid-state compound for varying the reflectivity of the mirror in response to electrical voltage applied thereacross, as disclosed in U.S. Pat. No. 5,151,824, the disclosure of which is hereby incorporated herein by reference, or any other means for reflecting a rearward image to the driver of the vehicle, without affecting the scope of the present invention. Reflective element 18 is mounted to backing plate 20 via any suitable means, such as via adhesive, fasteners, or snap connectors or the like.

As shown in FIGS. 2–5, backing plate 20 includes a generally circular mounting portion 20a for pivotably securing backing plate 20 to the mirror actuator 26. The mirror actuator 26 is operable to adjust the position of backing plate 20 and reflective element 18 via extension and/or retraction of one or more movable members of the actuator in response to an electrical control within the vehicle, as is known.

Figure 4:
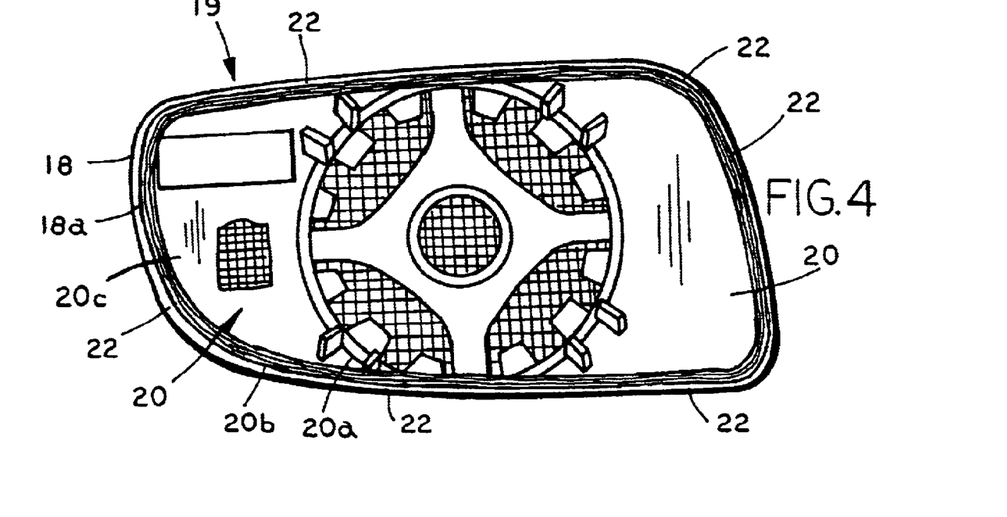
FIG. 4 is a rear view of a reflective element and backing plate useful with the present invention with an antenna positioned around a perimeter edge of the backing plate in accordance with the present invention.
Figure 5A:
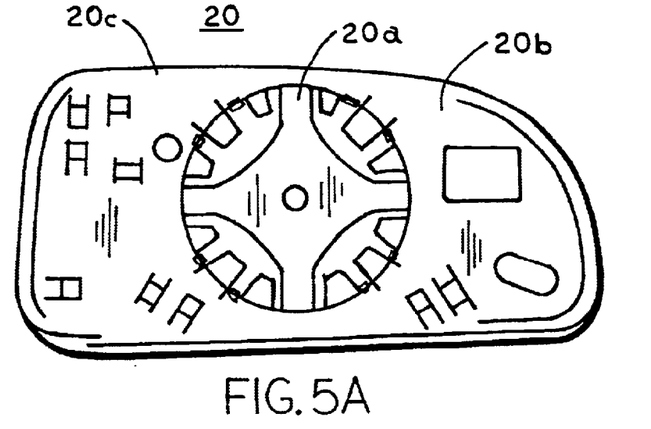
FIGS. 5A–5C are views of a backing plate useful with the present invention.
Figure 5B:
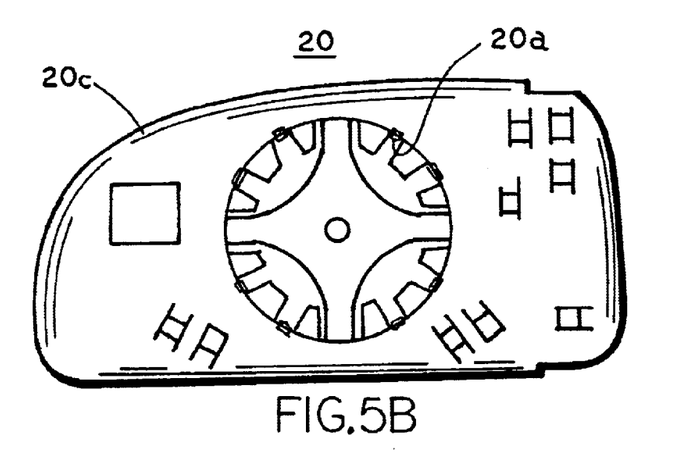
Figure 5C:
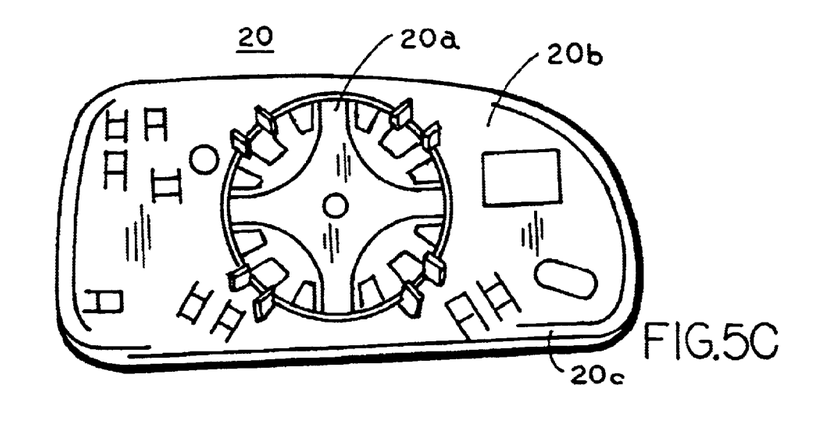
Figure 6:
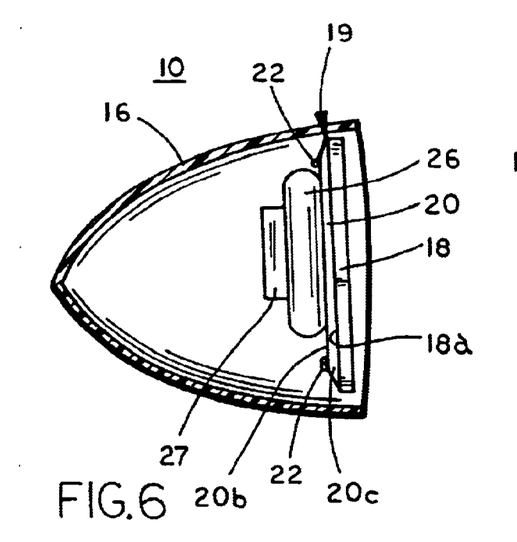
FIG. 6 is a partial sectional view of an exterior rearview mirror assembly in accordance with the present invention.

Backing plate 20 is preferably molded of a polymeric material and is snapped or otherwise secured to actuator 26 (if the mirror assembly is a power adjust mirror) or to housing 16 or the like (if the mirror assembly is a manually adjustable mirror). The reflective element subassembly 19 may further include a heating element or device 21 or 121 (FIGS. 11–13) which may be positioned adjacent the back surface of reflective element 18 and is operable to evaporate ice and dew from reflective element 18, as disclosed in U.S. Pat. No. 5,151,824, the disclosure of which is hereby incorporated herein by reference. As best shown in FIG. 4, backing plate 20 extends over the back surface of reflective element 18 (and may extend over the heating element as well) and extends toward an outer perimeter region 18a of the back surface of reflective element 18.

Figure 3:
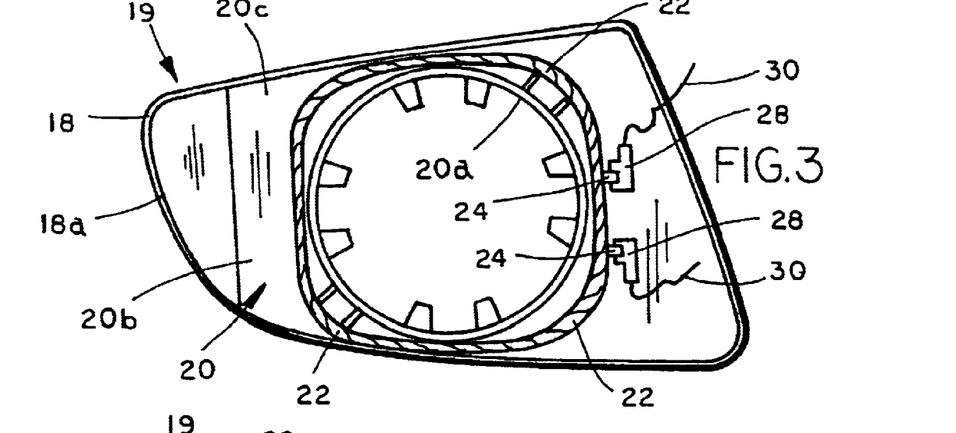
FIG. 3 is a view similar to FIG. 2, with an antenna in accordance with the present invention positioned about a backing plate of the mirror assembly.

Antenna 22 is wound or otherwise positioned at least partially around the perimeter region 20c of the rear or back surface 20b of backing plate 20. As shown in FIG. 4, antenna 22 may be wound one or more times around the outermost perimeter of backing plate 20. Alternately, as shown in FIG. 3, antenna 22 may be wound or positioned immediately about the mounting portion 20a of backing plate 20, such that the antenna is positioned radially inwardly of the perimeter edges of the backing plate and reflective element. It is further envisioned that the present invention may provide a segmented antenna 22' (FIG. 2), which includes multiple segments or pieces 22a' which are spaced about the perimeter of the backing plate 20 or may be otherwise positioned at various locations around the backing plate 20 and/or bezel 36.

Figure 7:
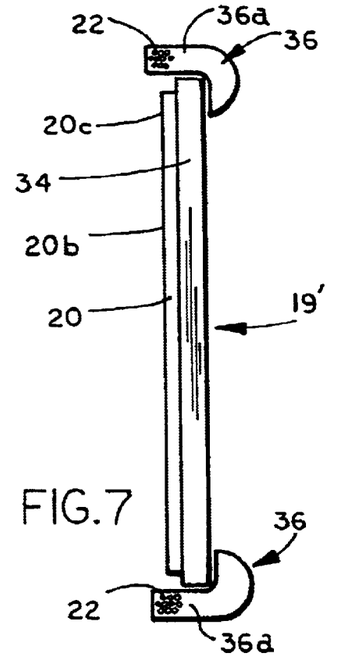
FIG. 7 is a partial sectional view of an electrochromic exterior rearview mirror assembly in accordance with the present invention, with the antenna positioned within an interior portion of the bezel.
Figure 8:
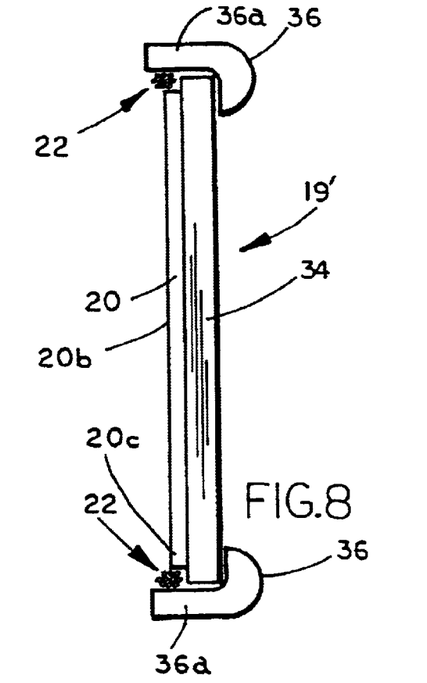
FIG. 8 is a partial sectional view similar to FIG. 6, with the antenna positioned between the outer perimeter edge of the backing plate and the interior portion of the bezel.
Figure 9:
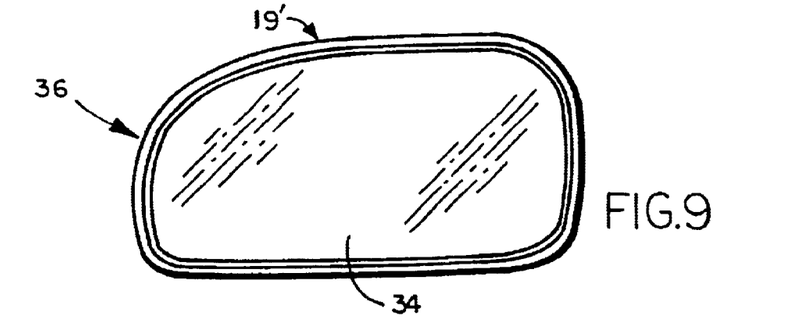
FIG. 9 is a front view of the mirror assembly of FIGS. 7 and 8, in a direction looking generally forwardly with respect to the vehicle.
Figure 10:
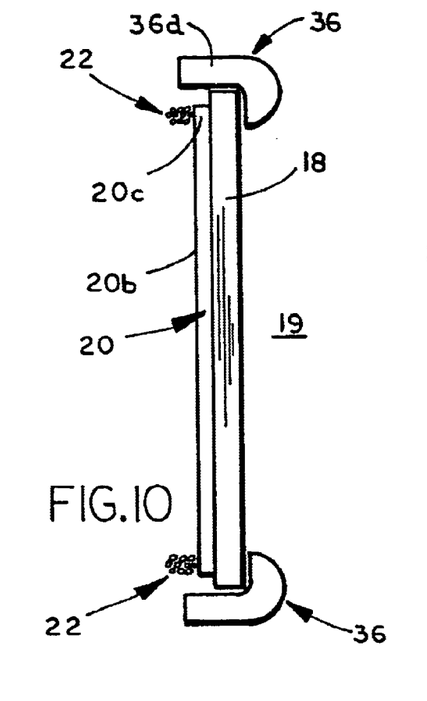
FIG. 10 is a partial sectional view similar to FIGS. 7 and 8, with the antenna positioned at a back surface of the backing plate.
Figure 11:
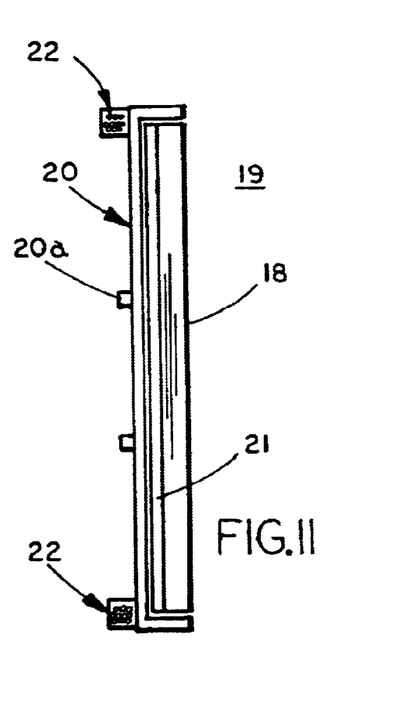
FIG. 11 is a partial sectional view of a reflective element subassembly which includes a heater element, with the antenna positioned around an outer perimeter edge of the backing plate.

Clearly, antenna 22 may be otherwise positioned around or at least partially within the back surface 20b of backing plate 20 in one or more segments, without affecting the scope of the present invention. For example, antenna 22 may be positioned around backing plate 20 and just to the rear of reflective element 18, or may be integrally molded within the outer region of the backing plate 20, such that antenna 22 is positioned within the backing plate 20 or a bezel 36 of the subassembly 19 and further protected and hidden from view (FIG. 11). Alternately, antenna 22 may be at a rear surface of the backing plate (FIG. 10) or may be partially encapsulated within a recess or groove (not shown) along the back surface of the backing plate. As shown in FIG. 7, for applications where the reflective element is an electrochromic reflective element 34, the antenna 22 may be wound or positioned within a portion, such as the inner portion 36*a*, of a bezel 36 of an electrochromic subassembly 19'. Alternately, as shown in FIG. 8, the antenna 22 may be wound or positioned between the outer perimeter edge 20*c* of backing plate 20 and the inner portion 36*a* of bezel 36, without affecting the scope of the present invention.

Preferably, the bezel has a width dimension in a range of approximately 3 mm to approximately 8 mm, more preferably, approximately 4 mm to approximately 7 mm, and most preferably, approximately 5 mm to approximately 6 mm. An example of a bezel useful with the present invention is disclosed in U.S. Pat. No. 5,151,824, issued to O'Farrell for VEHICULAR OUTSIDE MIRROR ASSEMBLY, which is hereby incorporated herein by reference.

Antenna 22 is preferably positioned around the perimeter of backing plate 20 and may be secured in place via suitable adhesives or sealants or the like. As shown in FIG. 3, a connector or connectors 24 is/are provided at the end of the antenna 22 for connecting antenna 22 to a corresponding connector or connectors 28 at the mirror assembly, door or vehicle, which are further connected to the signal device of the vehicle via suitable wirings 30. Wirings 30 may be conventional twisted wirings or cables and are operable to carry the signal and power for transmission of the signal by antenna or may be operable to carry the signal received by the antenna to a signal processing device for processing the signal. The connectors 28 may be conventional connectors or may comprise a pre-molded module which snaps onto the back of backing plate 20 for connection to connectors 24 of antenna 22. In applications where the antenna is molded within the backing plate or bezel of the mirror assembly, the antenna connector or connectors 24 may also be at least partially integrally molded with the backing plate or bezel to facilitate easy connection of antenna 22 to the appropriate signal device of the vehicle.

Optionally, the communication between the antenna and the signal device of the vehicle and/or communication between the antenna and, for example, a portable transducer or a fob or a door handle mechanism or a cell phone or similar device carried by a person approaching the vehicle or leaving the vehicle or in the vehicle, may be via a short range communication protocol, such as short range RF communication or wireless transmission protocols and standards, such as the BLUETOOTH low-cost, low-power radio based cable replacement or wireless link based on short-range radio-based technology, as disclosed in commonly assigned, co-pending U.S. patent application, Ser. No. 09/585,379, filed Jun. 1, 2000 by Hutzel et al. for REARVIEW MIRROR ASSEMBLY WITH UTILITY FUNCTIONS (Attorney Docket No. DON01 P-817), the disclosure of which is hereby incorporated herein by reference.

Figure 12:
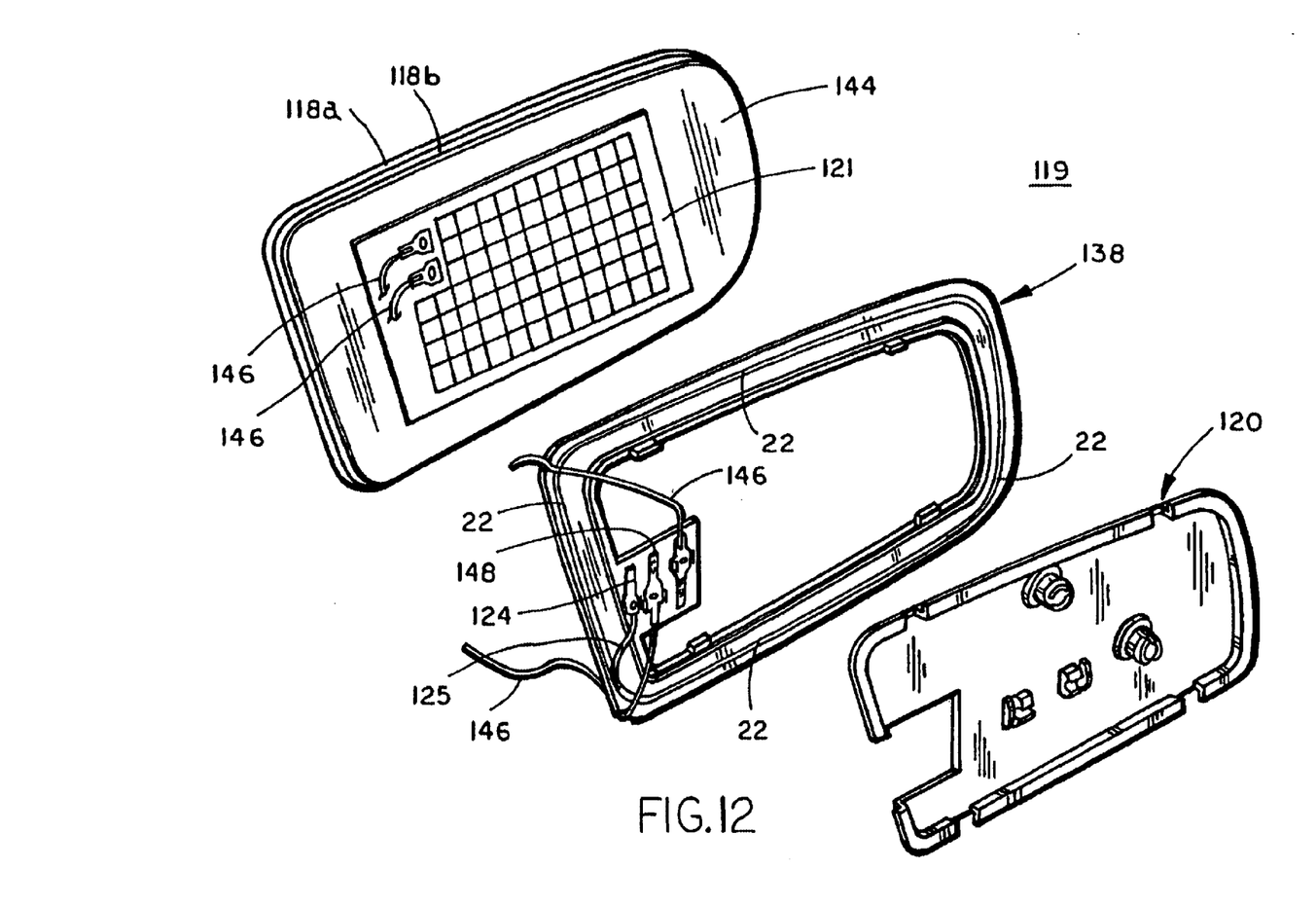
FIG. 12 is an exploded perspective view of a reflective element subassembly useful with the present invention.
Figure 13:
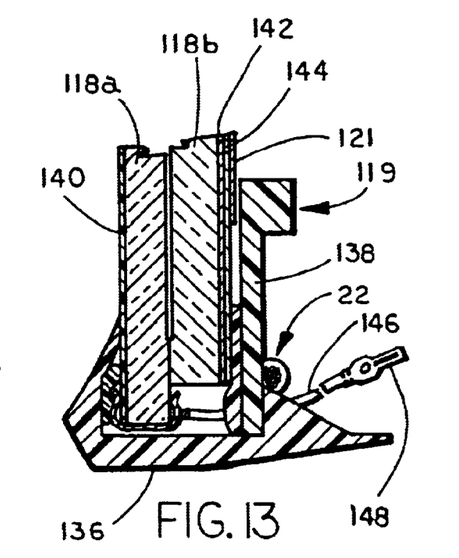
FIG. 13 is a sectional view of a portion of the reflective element subassembly of FIG. 12, as assembled for use with an exterior rearview mirror assembly.

As shown in FIGS. 12 and 13, a reflective element subassembly 119 may include one or more glass or plastic elements 118*a*, 118*b*, which are held together by a bezel 136 and retaining plate or ring 138. A protective coating 140 may be applied to an outer surface of outer element 118*a*, while a reflective layer 142 may be positioned along an inner surface of inner element 118*b*, as disclosed in U.S. Pat. No. 5,151,824 (although the reflective element may be a single element as discussed above, with other or no coatings thereon, without affecting the scope of the present invention). Reflective element subassembly 119 includes a heating pad or element 121, which may be applied at reflective layer 142 or at a foil sheet 144 or the like. When the elements 118*a*, 118*b* and heating pad 121 are assembled within retaining plate 138 and bezel 136, backing plate 120 is snapped or otherwise secured to retaining plate 138, such that reflective element subassembly 119 may be mounted as part of an appropriate exterior rearview mirror assembly. Antenna 22 may be positioned at an inner portion of the subassembly, such as at or within backing plate 120 or at or within an inner portion of bezel 136 or at or within retaining plate 138 (as shown in FIGS. 12 and 13), without affecting the scope of the present invention.

Because the reflective element subassembly 119 includes heating element 121, the wiring 146 and connector 148 for the heating element 121 are already part of the subassembly. Accordingly, a connector 124 and wiring 125 for antenna 22 may also be provided to the subassembly, and may be connectable to corresponding connectors within the exterior rearview mirror assembly in a similar manner as the connectors 148 of the heating element 121. The connectors 124 and 148 may be combined (as a single multi-pin connector or the like) to provide for a single connection to a connector or wiring at the exterior rearview mirror assembly for both the heater and the antenna to further enhance the assembly processes of the exterior rearview mirror assembly.

Antenna 22 may comprise any known antenna material. For example, antenna 22 may be a metallic-receiving antenna comprising, for example, 6 to 20 gauge copper wire, a radio frequency (RF)-receiving antenna, an infrared (IR)-receiving antenna, a microwave-receiving antenna and/or the like. The antenna may be coated or otherwise protected by an outer coating or sleeve to protect the antenna from exposure to the elements.

The antenna of the present invention thus provides for a substantially large antenna, which is protected and hidden within the housing of the exterior mirror assembly. The length of the antenna may be selected depending on the particular application. Because the typical dimensions of an exterior reflective element are approximately 100 to 250 mm or greater by 50 to 150 mm or greater, antenna 22 may provide a length of approximately 300 mm to 800 mm or more if it is wrapped only once entirely around the perimeter of the backing plate. As shown in FIG. 4, however, antenna 22 may be wrapped multiple times, such as approximately 50–60 times, around the mounting portion 20*a* or outer perimeter 20*c* of the back surface 20*b* of backing plate 20, to provide additional length and power to the antenna. Such an antenna is sufficient to facilitate transmission of various signals through antenna 22. The dimensions and number of turnings or wrappings of the antenna could be selected or tuned for the particular application of the antenna. Antenna 22 is also suitable to receive transmission signals from a remote source, without affecting the scope of the present invention.

Because antenna 22 is suitable for transmitting signals, antenna 22 is applicable for use with a signal transmitting device, such as an entry system, a passive entry system or a security system or the like. For example, a passive entry system may be operable with antenna 22 to emit a low frequency signal (preferably, the signal is less than about one megahertz, more preferably, less than about 0.5 megahertz and, most preferably, less than about 0.25 megahertz, while preferably being greater than about 0.05 megahertz) in a limited or targeted region 32 (FIG. 1) at the vehicle and generally surrounding the exterior mirror assembly at the side of the vehicle. As shown in FIG. 1, the region 32 may include an area or zone 32a at the side of the vehicle at which antenna 22 is positioned, and may further include an area or zone 32b rearward of the vehicle, since the signal may be strong enough to transmit through the windows and to the rear of the vehicle as well. Optionally, the signal device may be operable to begin transmitting the low frequency signal in response to a person touching or lifting one of the door handles of the vehicle. The signal device may further include a timing device for providing a time out period for the signal, such that the signal is deactivated a period of time following the activation of the signal. Optionally, the signal may also or otherwise be deactivated in response to the door opening or the like.

The transmitted signal may be received by a receiving device, such as a receiving device within a key fob carried by a person remote from the vehicle, when the receiving device enters the zone or zones 32 covered by the transmitted signal. The key fob or transducer may then be operable to transmit a second signal to unlock the vehicle doors or the like, in response to receiving the signal from antenna 22. The doors of the vehicle are thus unlocked as the person approaches the vehicle via automatic triggering of the transducer carried by the vehicle owner, without the owner having to manually actuate a button or the like on the key fob or transducer. Because the antenna is strong enough to transmit the signal within zone 32, the signal is also receivable by a transducer and operator at or approaching the rear and/or rear side door of the vehicle as well as the front side door where the mirror assembly is located.

It is further envisioned that the passive entry system may include a personal identification coding system which is operable to confirm the identity of the person carrying the transducer or otherwise attempting to unlock and open the vehicle door. The identification system may be activated in response to detection of a transducer in the vicinity of the vehicle or in response to a touching or lifting of one of the door handles of the vehicle. Once the identification system is activated, the person may speak, whereby the identification system is operable to identify the voice pattern or spoken code word and unlock and/or open the door(s) in response to recognition of the voice pattern and/or code word. The identification system may be operable auxiliary to the transducer/key fob of the passive entry system (in case the owner has lost or forgotten the key fob) or may be a separate system independent of any remote door lock/unlock transducer or system. It is further envisioned that the identification system may also or otherwise be operable to identify or recognize other characteristics, such as, for example, biometric characteristics, such as a fingerprint, thermal profile, smell or odor, retina pattern, or the like of the person at the vehicle to determine if the identified characteristic or characteristics match the owner of the vehicle or other person authorized to enter the vehicle.

Optionally, the exterior rearview mirror assembly may include a security light and/or a turn signal or the like. Antenna 22 may then serve as the antenna for receiving and/or transmitting a signal for the door lock system and/or for a security lighting system. For example, antenna 22 may be operable to receive a signal from a transducer or the like and communicate the signal to a light control, which may in turn actuate a security light or lights at the exterior rearview mirror and/or elsewhere on and/or in the vehicle. The security light may be positioned at the exterior rearview mirror assembly and may be of the type disclosed in U.S. Pat. Nos. 6,280,069; 6,276,821; 6,176,602; 6,149,287; and 5,497,305, issued to Pastrick et al.; and/or U.S. Pat. Nos. 6,086,229 and 5,497,306, issued to Pastrick, which are all hereby incorporated herein by reference.

Therefore, the present invention provides an antenna for a signal transmitting or receiving device of a vehicle. The antenna is positioned at or within a backing plate and/or a bezel for a reflective element of an exterior rearview mirror assembly at an exterior side of the vehicle. The antenna is thus positioned within and surrounded by polymeric components, such as the housing and backing plate, such that the signal being transmitted and received by the antenna is not interfered with by any electromagnetic radiation shielding (such as Faraday cage shielding) associated with any metallic components of the vehicle and/or by any magnetic fields associated with any metallic components of the vehicle. Also, the antenna of the present invention is positioned at an area which is substantially, and preferably entirely, out of view or hidden from view and protected within the housing of the mirror assembly.

The present invention thus provides significant advantages over antennas and exterior mirror assemblies of the prior art by positioning the antenna at or as part of a mirror reflective element subassembly (such as at or part of the bezel or backing plate). For example, a mirror reflective element manufacturer, such as a manufacturer of a silvered, flat, convex or aspheric metallic reflective element, such as those that use a chromium reflector or the like, or a manufacturer of a flat, convex or aspheric electro-optic (such as electrochromic) or other variable reflectance reflective elements, can supply a unitary exterior side view mirror reflective element subassembly or module to an external or internal exterior side view mirror assembler or manufacturer. The unitary reflective element module includes at least the reflective element, the backing plate and/or bezel, and an antenna (which further includes appropriate or standard connectors). This allows the reflective element subassembly to be implemented at a variety of mirror designs or applications, in contrast to the prior art mirrors, where placement of an antenna can be unique to a particular exterior side view mirror assembly design, thus leading to increased cost of the mirror assemblies and difficult assembly processes and additional part numbers in the assembly plants.

Additionally, because some reflective element and backing plate assemblies in production today already include a heater and/or electrochromic elements or the like, or are otherwise electrically powered or controlled, the assemblies already often include one or more electrical connectors for connecting to the mirror assembly. Accordingly, enhanced assembly processes may be achieved by the present invention by providing connection to the antenna at the reflective element subassembly or module with the same or common or standard connectors as are often already provided with the reflective element and backing plate/bezel assemblies or subassemblies.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. An exterior rearview mirror assembly for a vehicle comprising:

a housing; and a reflective element subassembly adjustable positioned within said housing, said reflective element subassembly including a reflective element and at least one of a bezel and a backing plate, said reflective element subassembly further including an antenna member which is positioned at said reflective element subassembly, said antenna member being connected to an entry system of the vehicle which is operable to unlock the door of the vehicle in response to an unlocking signal, said entry system including an identification system which is operable to confirm an identity of a person approaching or at the vehicle before unlocking the door of the vehicle via recognition of said unlocking signal, said unlocking signal comprising at least one of a transducer signal, a voice signal, and at least one biometric characteristic of the person, wherein said identification system is actuated in response to at least one of a touching of a door handle of the vehicle, a lifting of a door handle of the vehicle, and a transducer detection.

2. The exterior rearview mirror assembly of claim 1, wherein said antenna member is positioned at least partially around a rearward portion of said reflective element subassembly.

3. The exterior rearview mirror assembly of claim 1, wherein said antenna member is positioned at said backing plate.

4. The exterior rearview mirror assembly of claim 1, wherein said antenna member is positioned at said bezel.

5. The exterior rearview mirror assembly of claim 1, wherein said antenna member is positioned between said bezel and an outer perimeter edge of said backing plate.

6. The exterior rearview mirror assembly of claim 1, wherein said antenna member is integrally molded within one of said bezel and said backing plate.

7. The exterior rearview mirror assembly of claim 1, wherein said reflective element subassembly further includes a heating element at said reflective element.

8. The exterior rearview mirror assembly of claim 1, wherein said reflective element subassembly includes a backing plate for mounting said reflective element subassembly to an electrically powered reflective element positioning actuator.

9. The exterior rearview mirror assembly of claim 1, wherein said reflective element comprises an electro-optic element.

10. The exterior rearview mirror assembly of claim 9, wherein said electro-optic element comprises an electrochromic element.

11. The exterior rearview mirror assembly of claim 10 further comprising a bezel positioned at a perimeter of said electrochromic element.

12. The exterior rearview mirror assembly of claim 11, wherein said antenna member is positioned at said bezel.

13. The exterior rearview mirror assembly of claim 1, wherein said entry system is responsive to a vocal signal being received by said antenna member.

14. The exterior rearview mirror assembly of claim 13, wherein said entry system includes a voice recognition system which is operable to recognize at least one of a voice pattern and a code word in the vocal signal.

15. The exterior rearview mirror assembly of claim 1, wherein said entry system comprises a passive entry system.

16. The exterior rearview mirror assembly of claim 1, further including a security light.

17. The exterior rearview mirror assembly of claim 16, wherein said security light is actuatable in response to a signal received by said antenna member.

18. The exterior rearview mirror assembly of claim 1, wherein said antenna member comprises at least one of a metallic antenna, an infrared-receiving antenna, a radio frequency-receiving antenna and a microwave-receiving antenna.

19. The exterior rearview mirror assembly of claim 1, wherein said antenna member comprises part of a vehicle door lock/unlock system which is operable to lock and/or unlock system is response to a signal.

20. The exterior rearview mirror assembly of claim 19, wherein said vehicle door lock/unlock system is responsive to a biometric characteristic signal.

21. The exterior rearview mirror assembly of claim 20, wherein said biometric characteristic signal comprises at least one of a fingerprint, a thermal profile, an odor, a retina pattern and a voice pattern.

22. An exterior rearview mirror assembly for a vehicle comprising:

a housing;

a reflective element;

a backing plate, said reflective element being mounted to said backing plate, said backing plate extending at least partially around a portion of a back surface of said reflective element, said backing plate being adjustable to adjust a position of said backing plate and said reflective element with respect to said housing of said rearview mirror assembly; and an antenna member which is positioned at said reflective element, said antenna member being connected to an entry system of the vehicle which is operable to unlock the door of the vehicle in response to an unlocking signal, said entry system including an identification system which is operable to confirm an identity of a person approaching or at the vehicle before unlocking the door of the vehicle via recognition of said unlocking signal, said unlocking signal comprising at least one of a transducer signal, a voice signal, and at least one biometric characteristic of the person, wherein said identification system is actuated in response to at least one of a touching of a door handle of the vehicle, a lifting of a door handle of the vehicle, and a transducer detection.

23. The exterior rearview mirror assembly of claim 22, wherein said antenna member is positioned at least partially around said reflective element.

24. The exterior rearview mirror assembly of claim 22, including a reflective element actuator, said backing plate being adjustably mounted to said actuator, said actuator being mounted to said housing and being operable to adjust a position of said backing plate and said reflective element with respect to said housing of said rearview mirror assembly.

25. The exterior rearview mirror assembly of claim 22, wherein said antenna comprises a transmitting antenna which is operable to transmit signals from a signal device of the vehicle.

26. The exterior rearview mirror assembly of claim 25, wherein said signal device comprises at least one of a cellular telephone, a passive entry system, a tire pressure sensing system, a garage door opening system, a security system and a global positioning system.

27. The exterior rearview mirror assembly of claim 22, wherein said antenna member comprises a receiving antenna which is operable to receive signals from a source remote from the vehicle.

28. The exterior rearview mirror assembly of claim 27, wherein said remote source comprises at least one of a cellular telephone, a global positioning system and a security system.

29. The exterior rearview mirror assembly of claim 28, wherein said remote source comprises a security system, said security system including at least one security light.

30. The exterior rearview mirror assembly of claim 29, wherein said at least one security light is positioned at said exterior rearview mirror assembly.

31. The exterior rearview mirror assembly of claim 22, wherein said antenna member is positioned at at least a portion of at least one of said backing plate and a bezel around a perimeter edge of said reflective element.

32. The exterior rearview mirror assembly of claim 31, wherein said antenna member is integrally molded with said backing plate or said bezel.

33. The exterior rearview mirror assembly of claim 32, wherein a connector for connecting said antenna member to a corresponding connector at the vehicle is also integrally molded with said backing plate or said bezel.

34. The exterior rearview mirror assembly of claim 22, wherein said antenna member includes a connector for connecting said antenna member to a corresponding connector at one of said housing and the vehicle.

35. The exterior mirror assembly of claim 22, wherein said antenna member is wrapped around a perimeter of said backing plate at least two times.

36. The exterior rearview mirror assembly of claim 22, wherein said antenna member is positioned at said reflective element between a perimeter edge of said backing plate and a bezel around a perimeter edge of said reflective element.

37. The exterior rearview mirror assembly of claim 22, wherein said antenna member comprises at least one of a metallic antenna, an infrared-receiving antenna, a radio frequency-receiving antenna and a microwave-receiving antenna.

38. The exterior rearview mirror assembly of claim 22, wherein said reflective element comprises an electro-optic element.

39. The exterior rearview mirror assembly of claim 38, wherein element comprises an electrochromic element.

40. The exterior rearview mirror assembly of claim 39, further comprising a bezel positioned at a perimeter of said electrochromic element.

41. The exterior rearview mirror assembly of claim 40, wherein said antenna member is positioned at said bezel.

42. The exterior rearview mirror assembly of claim 22, wherein said entry system is responsive to a vocal signal being received by said antenna member.

43. The exterior rearview mirror assembly of claim 42, wherein said entry system includes a voice recognition system which is operable to recognize at least one of a voice pattern and a code word in the vocal signal.

44. The exterior rearview mirror assembly of claim 22, wherein said entry system comprises a passive entry system.

45. The exterior rearview mirror assembly of claim 22, further including a security light.

46. The exterior rearview mirror assembly of claim 45, wherein said security light is actuatable in response to a signal received by said antenna member.

47. The exterior rearview mirror assembly of claim 22, wherein said antenna member comprises part of a vehicle door lock/unlock system which is operable to lock and/or unlock a door in response to a signal.

48. The exterior rearview mirror assembly of claim 47, wherein said vehicle door lock/unlock system is responsive to a biometric characteristic signal.

49. The exterior rearview mirror assembly of claim 48, wherein said biometric characteristic signal comprises at least one of a fingerprint, a thermal profile, an odor, a retina pattern and a voice pattern.

50. An exterior rearview mirror assembly for a vehicle comprising:

a housing; and a reflective element subassembly adjustably positioned within said housing, said reflective element subassembly including a reflective element and at least one of a bezel and a backing plate, said reflective element subassembly further including an antenna member; and an entry system which is operable to at least one of unlock a door of the vehicle and open a door of the vehicle in response to an unlocking signal, said antenna member receiving said unlocking signal and transmitting said unlocking signal to said entry system, said entry system including an identification system which is operable to confirm an identity of a person approaching or at the vehicle before unlocking the door of the vehicle via recognition of said unlocking signal, said unlocking signal comprising at least one of a transducer signal, a voice signal, and at least one biometric characteristic of the person, wherein said identification system is actuated in response to at least one of a touching of a door handle of the vehicle, a lifting of a door handle of the vehicle, and a transducer detection.

51. The exterior rearview mirror assembly of claim 50, wherein said reflective element comprises an electro-optic element.

52. The exterior rearview mirror assembly of claim 51, wherein said electro-optic element comprises an electrochromic element.

53. The exterior rearview mirror assembly of claim 52, wherein said reflective element subassembly includes a bezel positioned at a perimeter of said electrochromic element.

54. The exterior rearview mirror assembly of claim 53, wherein said antenna member is positioned at said bezel.

55. The exterior rearview mirror assembly of claim 50, wherein said identification system is responsive to a biometric characteristic signal.

56. The exterior rearview minor assembly of claim 55, wherein said biometric characteristic signal comprises at least one of a fingerprint, a thermal profile, an odor, a retina pattern and a voice pattern.

57. The exterior rearview mirror assembly of claim 50, wherein said entry system is responsive to a vocal signal being received by said antenna member.

58. The exterior rearview mirror assembly of claim 57, wherein said entry system includes a voice recognition system which is operable to recognize at least one of a voice pattern and a code word in the vocal signal.

59. The exterior rearview mirror assembly of claim 50, wherein said entry system comprises a passive entry system.

60. The exterior rearview mirror assembly of claim 50, further including a security light.

61. The exterior rearview mirror assembly of claim 60, wherein said security light is actuatable in response to a signal received by said antenna member.

62. The exterior rearview mirror assembly of claim 50, wherein said antenna member comprises at least one of a metallic antenna, an infrared-receiving antenna, a radio frequency-receiving antenna and a microwave-receiving antenna.

* * * * *

UNITED STATES PATENT AND TRADEMARK OFFICE
CERTIFICATE OF CORRECTION

PATENT NO. : 6,697,024 B2  Page 1 of 1
APPLICATION NO. : 10/001583
DATED : February 24, 2004
INVENTOR(S) : Fuerst et al.

It is certified that error appears in the above-identified patent and that said Letters Patent is hereby corrected as shown below:

Column 9
Claim 1, Line 2, "adjustable" should be --adjustably--

Column 10
Claim 19, Line 8, "system is" should be --a door in--
Claim 25, Line 52, insert --member-- after "antenna"

Column 11
Claim 35, Line 22, insert --rearview-- before "mirror"
Claim 39, Line 38, insert --said reflective-- after "wherein"

Column 12
Claim 56, Line 42, "minor" should be --mirror--

Signed and Sealed this

Twentieth Day of January, 2009

JON W. DUDAS
*Director of the United States Patent and Trademark Office*